(12) United States Patent
Kim

(10) Patent No.: US 11,661,056 B2
(45) Date of Patent: May 30, 2023

(54) LANE KEEPING ASSIST APPARATUS OF A VEHICLE WITH A TRAILER, A SYSTEM HAVING THE SAME, AND A METHOD THEREOF

(71) Applicants: HYUNDAI MOTOR COMPANY, Seoul (KR); KIA MOTORS CORPORATION, Seoul (KR)

(72) Inventor: Sang Jun Kim, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 261 days.

(21) Appl. No.: 16/822,559

(22) Filed: Mar. 18, 2020

(65) Prior Publication Data
US 2021/0078572 A1    Mar. 18, 2021

(30) Foreign Application Priority Data
Sep. 18, 2019    (KR) .................. 10-2019-0114877

(51) Int. Cl.
| | | |
|---|---|---|
| B60W 30/12 | (2020.01) | |
| G08G 1/16 | (2006.01) | |
| B60W 30/095 | (2012.01) | |
| B60W 10/18 | (2012.01) | |
| B60W 50/14 | (2020.01) | |
| G06V 20/56 | (2022.01) | |

(52) U.S. Cl.
CPC ............ *B60W 30/12* (2013.01); *B60W 10/18* (2013.01); *B60W 30/0953* (2013.01); *B60W 30/0956* (2013.01); *B60W 50/14* (2013.01); *G06V 20/588* (2022.01); *G08G 1/167* (2013.01)

(58) Field of Classification Search
CPC .. B60W 30/12; B60W 10/18; B60W 30/0953; B60W 30/0956; B60W 50/14; B60W 2050/0075; B60W 2300/14; B60W 2556/45; B60W 2556/65; B60W 30/09; B60W 30/165; B60W 30/18163; B60W 2554/80; B60W 2710/18; B60W 40/02; G06V 20/588; G08G 1/167; G08G 1/22; B60Y 2200/147; B60Y 2300/09; B60Y 2300/12; B60Y 2300/18166; G05D 1/0291

See application file for complete search history.

(56) References Cited

U.S. PATENT DOCUMENTS

| | | | | |
|---|---|---|---|---|
| 2017/0168503 A1* | 6/2017 | Amla | .................... | G05D 1/0295 |
| 2017/0344023 A1* | 11/2017 | Laubinger | ........... | B60W 30/165 |
| 2017/0369067 A1* | 12/2017 | Saigusa | ................. | B60W 30/16 |
| 2018/0056998 A1* | 3/2018 | Benosman | ............. | G08G 1/163 |
| 2018/0188746 A1* | 7/2018 | Lesher | .................. | B60W 40/08 |

* cited by examiner

*Primary Examiner* — Jason Holloway
(74) *Attorney, Agent, or Firm* — Lempia Summerfield Katz LLC

(57) ABSTRACT

A lane keeping assist apparatus of a vehicle with a trailer, a system having the same, and a method thereof include a processor to request an advancing vehicle to control partial braking over the trailer of the advancing vehicle based on a lane departure amount of the advancing vehicle when the advancing vehicle departs from a lane.

16 Claims, 5 Drawing Sheets

LANE KEEPING ASSIST APPARATUS OF A VEHICLE WITH A TRAILER, A SYSTEM HAVING THE SAME, AND A METHOD THEREOF

CROSS-REFERENCE TO RELATED APPLICATION

This application claims the benefit of priority to Korean Patent Application No. 10-2019-0114877, filed in the Korean Intellectual Property Office on Sep. 18, 2019, the entire contents of which are incorporated herein by reference.

TECHNICAL FIELD

The present disclosure relates to a lane keeping assist apparatus of a vehicle with a trailer, a system having the same, and a method thereof, and more particularly to a technology for controlling lane keeping by a partial braking over a trailer in an emergency situation during driving.

BACKGROUND

Platooning is a technology of performing self-driving in a state that a plurality of vehicles is aligned in line at specific distances. A leading vehicle, which is positioned at the forefront of a platooning line, may control at least one following vehicle of the leading vehicle during the platooning. The leading vehicle may maintain the distances between a plurality of vehicles included in the platooning line. The leading vehicle may further exchange information on behaviors and situations of the plurality of vehicles included in the platooning line through vehicle to vehicle (V2V) communication. The platooning vehicles may perform inter-vehicle distance control and emergency braking control, based on the V2V communication information received from an advancing vehicle and a sensor mounted on a subject vehicle.

Most of the platooning vehicles may be equipped with a trailer. Such vehicles having trailers, i.e., semi trucks or tractor trailers, transversely control a tractor to perform steering in a direction opposite to a departure direction. Thus, the trailer of the vehicle gravitates inward a lane when the trailer departs from the lane of travel under a lane keeping situation of the platooning driving on a curved road.

However, conventionally, the trailer is not directly controlled, but a tractor driving the trailer is controlled. Accordingly, it takes long time to return the trailer into the lane. In addition, the vehicle travels while moving to one-sided lane instead of the center of the lane. Thus, a collision possibility with a surrounding vehicle traveling along a next or adjacent lane may be increased and safety is not ensured. In particular, when the trailer vehicles perform a platooning during a self-driving at regular distances, the trailer may departure from the lane to collide with a surrounding vehicle.

SUMMARY

The present disclosure has been made to solve the above-mentioned problems occurring in the prior art while advantages achieved by the prior art are maintained intact.

An aspect of the present disclosure provides a lane keeping assist apparatus of a vehicle with a trailer. The apparatus is configured to directly control a trailer through a partial braking instead of a steering control of a tractor in an emergency situation during traveling. Thus, the trailer may be rapidly returned into a lane and the collision risk with a surrounding vehicle may be reduced. The present disclosure also provides a system having the same and a method thereof.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a lane keeping assist apparatus of a vehicle with a trailer may include a processor to request an advancing vehicle to control a partial braking over a trailer of the advancing vehicle. The control is based on a lane departure amount of the advancing vehicle when the advancing vehicle apparatus departs from a lane.

According to an embodiment, the processor may determine an intent of the advancing vehicle (LV) to undergo, or for, a lane change when a rear wheel of the advancing vehicle departs from the lane.

According to an embodiment, the processor may determine the intent of the advancing vehicle for the lane change based on an On/Off state of a direction indication level of the advancing vehicle.

According to an embodiment, the processor may determine whether the lane departure amount satisfies a preset condition when the advancing vehicle has no intent for the lane change.

According to an embodiment, the processor may request the advancing vehicle to control the partial braking over the trailer of the advancing vehicle and transmit information on whether a target is present in a blind zone of a subject vehicle and information on the target when the lane departure amount satisfies the preset condition.

According to an embodiment, the processor may determine that an emergency situation occurs when the lane departure amount is equal to or greater than a specific reference level and may request the advancing vehicle to control the partial braking over the trailer of the advancing vehicle.

According to an embodiment, the processor may determine whether the emergency situation occurs to determine whether to control the partial braking over the trailer when receiving the request for controlling the partial braking over the trailer from a following vehicle.

According to an embodiment, the processor may determine that the emergency situation occurs under at least one of the following situations. In one situation, a moving object is present in a blind zone of the advancing vehicle positioned at one side of a lane opposite to a lane from which the trailer departs. In another situation, a moving object is present within a specific distance to a front portion of the advancing vehicle positioned at one side of the lane opposite to the lane from which the trailer departs and the moving object is moving at a speed lower than a speed of a subject vehicle. In another situation, a moving object is present within a blind zone of a following vehicle in a lane in which the subject vehicle is traveling and a speed of the moving object is higher than a speed of the advancing vehicle in a lane in which the subject vehicle is currently traveling.

According to an embodiment, the processor may output a request for hands-on user steering and control a partial braking of a front wheel of the subject vehicle. Thus, the partial braking is controlled over the trailer.

According to another aspect of the present disclosure, a vehicle system of a vehicle including a trailer may include a communication device configured to communicate with another vehicle during travelling. The system further includes a lane keeping assist apparatus configured to request an advancing vehicle to control a partial braking over a trailer of the advancing vehicle through the communication device. The control depends on a lane departure amount of the advancing vehicle when the advancing vehicle departs from a lane.

According to an embodiment, the vehicle system may further include a partial braking device controlled by the lane keeping assist apparatus and configured to perform the partial braking over a front wheel of the trailer.

According to an embodiment, the vehicle system may further include a sensing device configured to sense that the advancing vehicle departs from the lane.

According to another aspect of the present disclosure, a lane keeping assist method may include determining a lane departure amount of an advancing vehicle when the advancing vehicle departs from a lane. The method may further include requesting the advancing vehicle to control a partial braking over a trailer of the advancing vehicle depending on the lane departure amount.

According to an embodiment, the determining the lane departure amount of the advancing vehicle may include determining an intent of the advancing vehicle for a lane change when a rear wheel of the advancing vehicle departs from the lane. The determining the lane departure amount of the advancing vehicle may further include determining whether the lane departure amount satisfies a preset condition when the advancing vehicle has no intent for the lane change.

According to an embodiment, the requesting of the advancing vehicle to control the partial braking over the trailer may include requesting the advancing vehicle to control the partial braking over the trailer of the advancing vehicle when the lane departure amount satisfies a specific condition. The requesting of the advancing vehicle to control the partial braking over the trailer may further include transmitting information on whether a target is present in a blind zone of a subject vehicle and information on the target.

According to an embodiment, the lane keeping assist method may further include determining whether an emergency situation occurs to determine whether to control the partial braking over the trailer when receiving the request for controlling the partial braking over the trailer from a following vehicle.

According to an embodiment, the determining of whether to control the partial braking over the trailer may include controlling the partial braking under at least one of the following situations. In one situation, a moving object is present in a blind zone of the advancing vehicle at a side of a lane opposite to a lane from which the trailer departs. In another situation, a moving object is present within a specific distance from a front portion of the advancing vehicle at the side of the lane opposite to the lane from which the trailer departs, and the moving object is moving at a speed lower than a speed of a subject vehicle. In another situation, a moving object is present in a blind area of a following vehicle in a lane in which the subject vehicle is traveling, and a speed of the moving object is higher than a present speed of the advancing vehicle in the lane in which the subject vehicle is currently traveling.

According to an embodiment, the lane keeping assist method may further include outputting a request for hands-on user steering when the control of the partial braking over the trailer is determined and controlling the partial braking over a front wheel of the subject vehicle.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
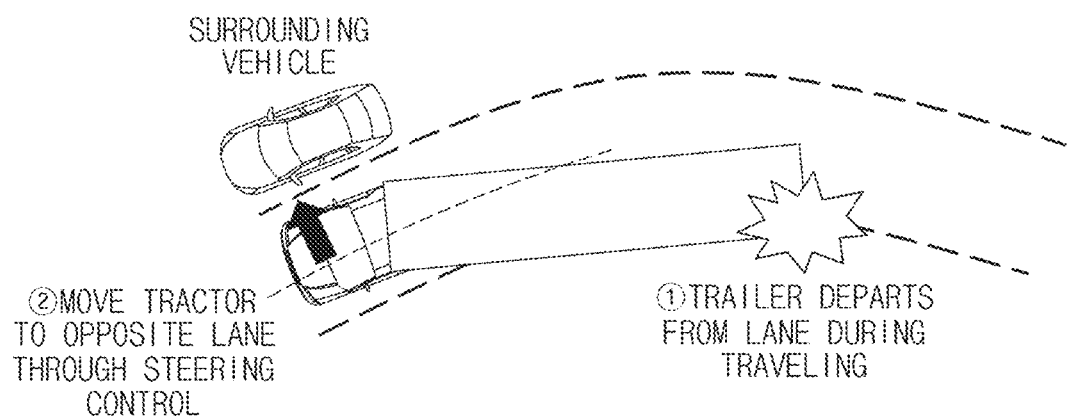
FIG. 1 is a view illustrating a dangerous situation in a lane keeping controlling of a typical trailer vehicle.

Hereinafter, some embodiments of the present disclosure are described in detail with reference to the drawings. In adding the reference numerals to the components of each drawing, it should be noted that an identical or equivalent component is designated by an identical numeral even when they are displayed on other drawings. Further, in describing an embodiment of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component. Such terms do not limit the nature, sequence or order of the constituent components. In addition, unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

The present disclosure discloses a technology of directly controlling a trailer through a partial braking in an emergency situation during a traveling Thus, the trailer may be rapidly returned into a lane and the risk and the possibility of interfering or colliding with a surrounding vehicle may be reduced. In an embodiment, the present disclosure discloses a technology of increasing safety in transversely controlling an entire platooning line when the following vehicle rapidly returns to a source central point for generating a path in the platooning line when the trailer vehicle performs platooning.

Hereinafter, embodiments of the present disclosure are described in detail with reference to FIGS. 2-5.

The present disclosure relates to a lane keeping assist apparatus of a vehicle (e.g., a trailer vehicle, a semi trailer, or a tractor trailer) with a trailer. In an embodiment, the present disclosure discloses a technology for a lane keeping assist apparatus for a trailer vehicle during platooning.

A leading vehicle (LV) and a following vehicle (FV) included in a platooning line may perform platooning on a road. The leading vehicle (LV) and the following vehicle (FV) may travel while maintaining a specific distance therebetween. While traveling, the leading vehicle (LV) or the following vehicle (FV) may adjust the distance between the leading vehicle (LV) and the following vehicle (FV). The leading vehicle LV or the following vehicle (FV) may increase or decrease the distance between the vehicles according to the operations of a driver.

In platooning, as the following vehicle (FV) detects/accumulates the central point of a trailer of an advancing vehicle and generates/follows the path of the following vehicle (FV), an unstable traveling of the advancing vehicle (LV) may adversely exert an influence on the following vehicle (FV). Therefore, according to the present disclosure, the following vehicle (FV) monitors whether a rear wheel of the trailer of the advancing vehicle departs from a lane. The following vehicle (FV) also transmits a request for a returning of the trailer to the advancing vehicle (LV) through a V2V communication when the rear wheel of the trailer of the advancing vehicle departs from the lane to a specific extent. The advancing vehicle (LV) may return the trailer thereof through partial braking instead of steering control when the returning of the trailer is rapidly necessary as the advancing vehicle detects the received information and a traveling situation.

Figure 2:
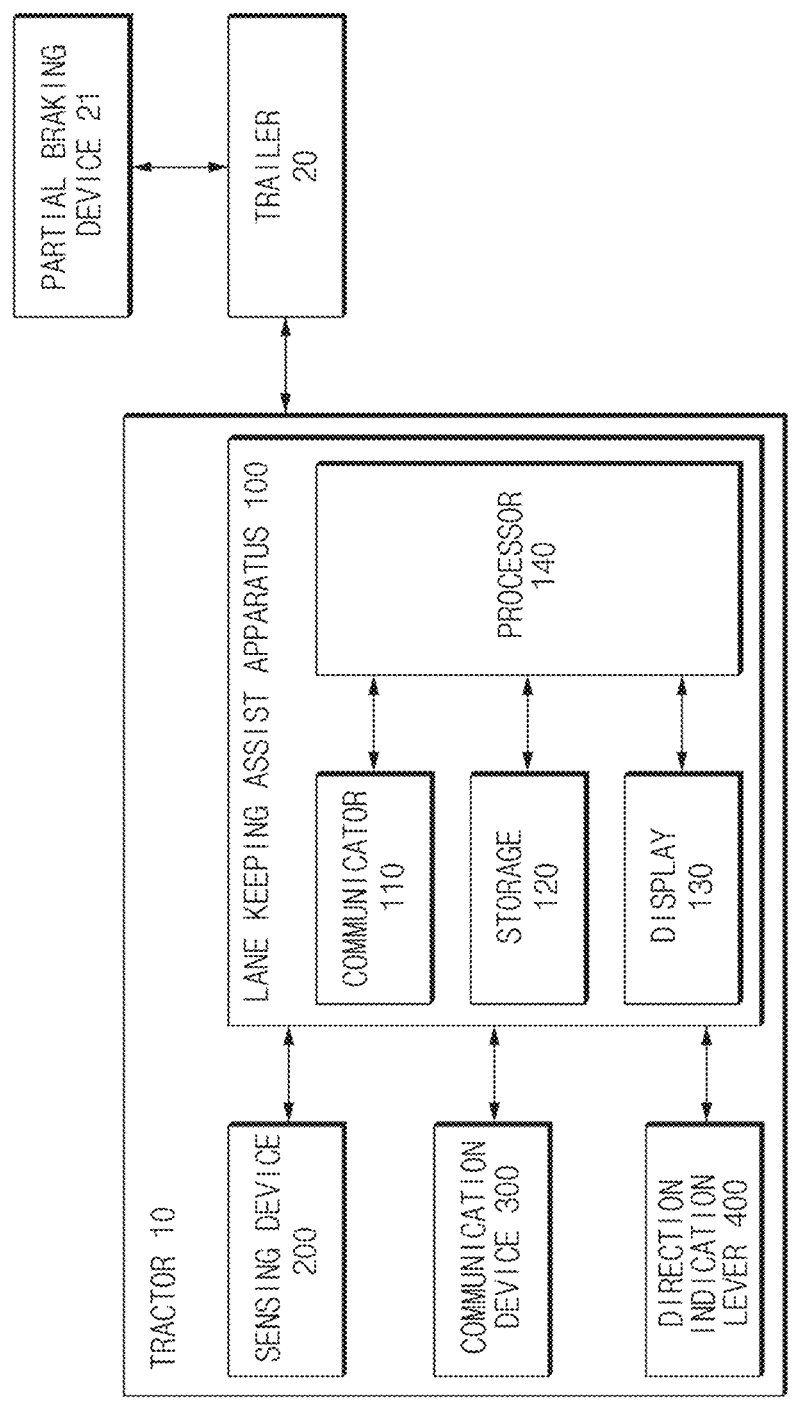
FIG. 2 is a block diagram illustrating a configuration of a vehicle system including a lane keeping assist apparatus according to an embodiment of the present disclosure.

FIG. 2 is a block diagram illustrating a configuration of a vehicle system including a lane keeping assist apparatus according to an embodiment of the present disclosure.

Referring to FIG. 2, a tractor 10 according to an embodiment of the present disclosure may include a lane keeping assist apparatus 100, a sensing device 200, a communication device 300, and a direction indication lever 400. The tractor 10 performs a vehicle driving while pulling a trailer 20.

The lane keeping assist apparatus 100 may request an advancing vehicle to control partial braking over a trailer of the advancing vehicle by a lane departure amount of the advancing vehicle when the advancing vehicle departs from a lane. In addition, the lane keeping assist apparatus 100 may determine whether an emergency situation occurs and may determine whether to perform the partial braking control over the trailer when receiving a request for the partial braking control over the trailer from a following vehicle (FV).

The lane keeping assist apparatus 100 may include a communicator 110, a storage 120, a display 130, and a processor 140.

The communicator 110 is a hardware device implemented with various electronic circuits to transmit and receive a signal through a wireless or wired connection. According to the present disclosure, the communicator 110 may make in-vehicle communication through a controller area network (CAN) communication, a local interconnect network (LIN) communication, or an Ethernet communication.

The storage 120 may store a sensing result of the sensing device 200 and a determination result, acquired by the processor 140, of a driving situation. The storage 120 may be implemented with at least one storage medium of a memory. The memory may be in a flash memory type, a hard disk type, a micro type, a card type (e.g., a Security Digital (SD) card or an eXtreme digital card). The memory may also be a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

The display 130 may be controlled by the processor 140 and may display a platooning situation and the determination result of the platooning situation. The display 130 may be implemented with a head up display (HUD), a cluster, an audio video navigation (AVN), or a human machine interface (HMI). In addition, the display 130 may include at least one of a liquid crystal display (LCD), a thin film transistor-liquid crystal display (TFT LCD), a light emitting diode (LED), an organic light-emitting diode (OLED), an active matrix OLED (AMOLED), a flexible display, a bended display, or a third dimension (3D) display. Among them, some displays may be implemented with transparent displays configured in a transparent type or a translucence type. Thus, the displays may be viewed from the outside. In addition, the display 130 is implemented with a touchscreen including a touch panel to be used as an input device in addition to an output device.

The processor 140 may be electrically connected with the communicator 110, the storage 120, and the display 130 and configured to electrically control each component. The processor 140 may be an electric circuit that executes software commands. Accordingly, the processor 140 may perform various data processing and calculations, as described below.

The processor 140 may request the advancing vehicle to control the trailer of the advancing vehicle through partial braking based on a lane departure amount of the advancing vehicle when the advancing vehicle departs from the lane.

The processor 140 may determine a will (i.e., an intent or whether about to undergo or is undergoing) of the advancing vehicle for a lane change when a rear wheel of the advancing vehicle (LV) departs from the lane.

The processor 140 may determine the will or intent of the advancing vehicle for the lane change depending on an ON/OFF state of a direction indication level of the advancing vehicle.

The processor 140 may determine whether the lane departure amount satisfies a preset condition when the advancing vehicle has no will of the lane change.

When the lane departure amount satisfies the preset condition, the processor 140 requests the advancing vehicle to control the trailer of the advancing vehicle through a partial braking. The processor 140 may transmit information on whether a target is present in a blind zone of a subject vehicle and information on the target.

The processor 140 may determine that an emergency situation occurs when the lane departure amount is equal to or greater than a specific reference level and may request the advancing vehicle to control the trailer of the advancing vehicle through partial braking.

When receiving the request for the partial braking control over the trailer from the following vehicle (FV), the processor 140 may determine whether the emergency situation occurs to determine whether to perform the partial braking control over the trailer.

The processor 140 may determine that the emergency situation occurs under at least one of the following situations. In one situation, a moving object is present in a blind zone (i.e., blind spot) of the advancing vehicle positioned at one side of a lane opposite to a lane from which the trailer departs. In another situation, a moving object is present within a specific distance to a front portion of the advancing vehicle positioned at one side of the lane opposite to the lane from which the trailer departs and the moving object is moving at a speed lower than a speed of a subject vehicle. In another situation, a moving object is present within a blind zone of a following vehicle in a lane in which the subject vehicle is traveling and a speed of the moving object is higher than a speed of the advancing vehicle in a lane in which the subject vehicle is currently traveling.

The processor 140 may output a request for hands-on user steering and control the partial braking over a front wheel of the subject vehicle so as to perform the partial braking control over the trailer.

The sensing device 200 may include a front camera positioned at a front portion of each vehicle during platooning and configured to recognize a trailer wheel of the advancing vehicle during the travelling and a front lane. In addition, the sensing device 200 may include a plurality of sensors for detecting a front vehicle, a rear vehicle, or a surrounding vehicle of the subject vehicle. The sensing device 200 may obtain information on positions, speeds, moving directions of the front vehicle, the rear vehicle, or surrounding vehicles and/or a type (e.g., a vehicle, pedestrian, a bicycle, or a motor cycle) of an external object. To this end, the sensing device 200 may include an ultrasonic sensor, a radar, a camera, a laser scanner and/or a corner radar, a LiDAR, an acceleration sensor, a yaw rate sensor, a torque measurement sensor and/or a wheel speed sensor, a steering angle sensor, or the like. In addition, although not illustrated in FIG. 2 in the present disclosure, a GPS information receiver may be further included to recognize location information of the subject vehicle.

The communication device 300 shares platooning traveling information by making a V2V communication with the vehicles in a platooning line. To this end, the communication device 300 may include various communication units: such as a mobile communication unit; a broadcast receiving unit, such as a digital multimedia broadcasting (DMB) module or a digital video broadcasting-handheld (DVB-H) module; a short-range communication unit, such as a ZigBee module or a near field communication (NFC) module, which is a Bluetooth module; and a Wi-Fi communication unit.

The direction indication lever 400 may receive the will of the user for the lane change through a multi-function switch.

A partial braking device 21 is linked to a front wheel of the trailer 20 to control the partial braking over the front wheel of the trailer 20 in response to a command from the lane keeping assist apparatus 100.

According to the present invention, in the emergency situation during traveling, the partial braking control is directly performed over the trailer to rapidly return the trailer into the lane. Thus, the collision risk and the collision probability with the surrounding vehicle may be rapidly reduced. In the platooning of the trailer vehicle, the following vehicle (FV) is rapidly returned to a source central point for generating the path in the platooning line. Thus, the transversal control safety for the whole platooning line may be increased.

Figure 3:
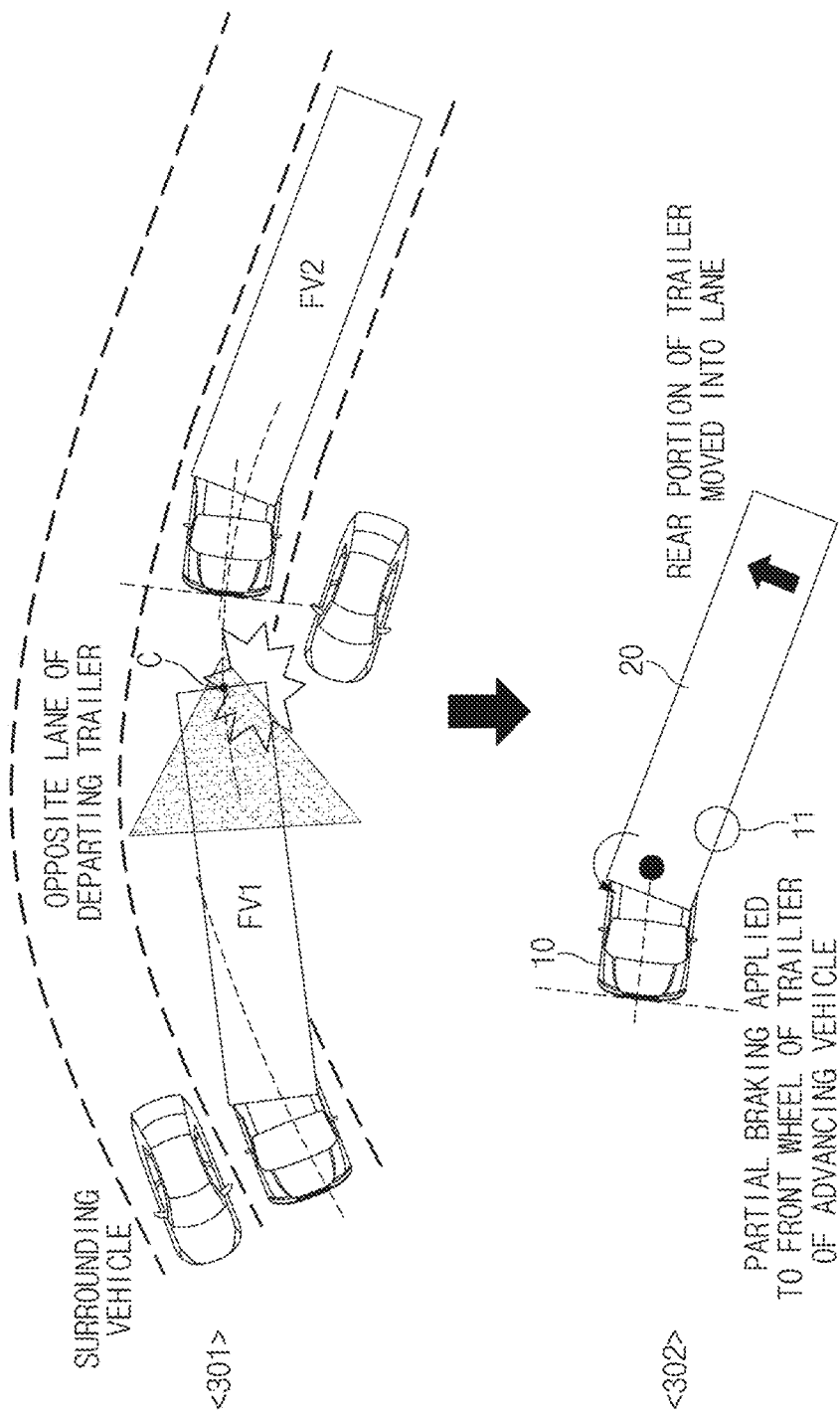
FIG. 3 is a view illustrating an operation to prevent a lane departure by the lane keeping assist apparatus according to an embodiment of the present disclosure.

FIG. 3 is a view illustrating an operation to prevent a lane departure by the lane keeping assist apparatus, according to an embodiment of the present disclosure.

In platooning, a following vehicle FV2 may detect and accumulate a central point C of a trailer of an advancing vehicle FV1 to generate and follow a path of the subject vehicle. Accordingly, unstable travelling of the advancing vehicle FV1 exerts an adverse influence on the path of the following vehicle FV2.

Referring to the reference numeral 301 of FIG. 3, the following vehicle FV2 monitors whether a rear wheel of the trailer of the advancing vehicle FV1 departs from a lane. The following vehicle FV2 requests the advancing vehicle FV1 to return the trailer through a V2V communication when the rear wheel of the trailer of the advancing vehicle FV1 departs from the lane by a specific amount.

Accordingly, the advancing vehicle FV1 detects the information received from the following vehicle FV2 and a traveling situation of the subject vehicle to determine whether to rapidly return the trailer into the lane. When the advancing vehicle FV1 determines to rapidly return the trailer into the lane, the advancing vehicle FV1 directly performs the partial braking control over a front wheel, which departs from the lane, of the trailer. Thus, the trailer is returned into the lane.

Referring to the reference numeral 302 of FIG. 3, the tractor 10 and the trailer 20 are linked to each other by a kingpin. Thus, only the trailer 20 may be rotated without significantly affecting the behavior of the tractor 10. In this case, when the partial braking is applied to the front wheel 11, which departs from the lane, of the trailer 20, the trailer 20 rotates about the kingpin. Thus, the departing rear portion of the trailer 20 is returned into the lane.

Figure 4:
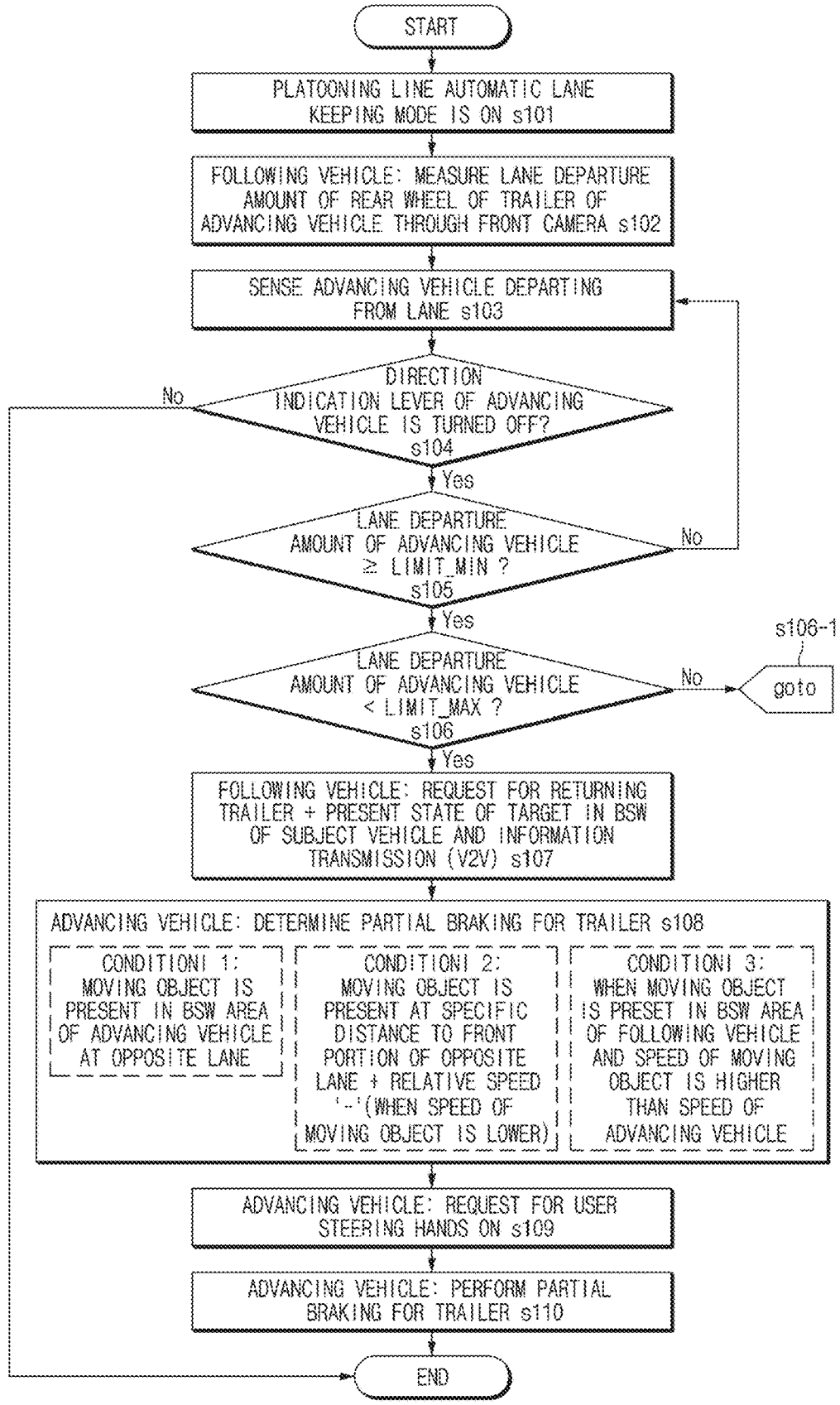
FIG. 4 is a flowchart illustrating a lane keeping assist method of a vehicle with a trailer according to an embodiment of the present disclosure.

A lane keeping assist method of a vehicle with a trailer is described in detail with reference to FIG. 4 according to an embodiment of the present disclosure. FIG. 4 is a flowchart illustrating a lane keeping assist method of a vehicle with a trailer according to an embodiment of the present disclosure.

It is assumed that the lane keeping assist apparatus 100 of FIG. 2 performs the process of FIG. 4. In addition, in the following description made with reference to FIG. 4, it may be understood that the operation described as being performed by the lane keeping assist apparatus 100 is controlled by the processor 140 of the lane keeping apparatus 100.

Referring to FIG. 4, the lane keeping assist apparatus 100 may, by using a front camera, determine whether a rear wheel of a trailer of an advancing vehicle departs from a lane. The lane keeping assist apparatus 100 may further measure a lane departure amount when vehicles in a platooning line have normal V2V communication states during platooning and when an automatic lane keeping mode is turned on (s101).

Accordingly, when the departure of the advancing vehicle from the lane (s103) is sensed, the lane keeping assist apparatus 100 of a following vehicle FV2 determines whether a direction indication lever of the advancing vehicle FV1 is turned off (s104). In other words, the lane keeping assist apparatus 100 of the following vehicle FV2 determines the user will of the advancing vehicle FV1 for the lane change based on the direction indication lever of the advancing vehicle FV1.

When the direction indication lever of the advancing vehicle FV1 is turned off, i.e., when the user of the advancing vehicle FV1 has no intent or will for a lane change, the lane keeping assist apparatus 100 of the following vehicle FV2 determines whether the lane departure amount of the advancing vehicle FV1 is greater than a preset minimum reference value Limit_Min (s105). When the lane departure amount of the advancing vehicle FV1 is smaller than the preset minimum reference value, the lane keeping assist apparatus 100 of the following vehicle FV2 does not determine that the advancing vehicle FV1 departs from the lane. The lane keeping assist apparatus 100 of the following vehicle FV2 continuously senses the lane departure amount without an additional request for the advancing vehicle FV1. Meanwhile, when the lane departure amount of the advancing vehicle FV1 is greater than the preset minimum reference value, the lane keeping assist apparatus 100 of the following vehicle FV2 determines whether the lane departure amount of the advancing vehicle FV1 is less than a preset maximum reference value Limit_Max (s106).

When the lane departure amount of the advancing vehicle FV1 is equal to or greater than the preset maximum reference value Limit_Max, it takes a lot of time to return to the lane of the trailer through steering of the tractor. Accordingly, a collision risk occurs with the following vehicles and surrounding driving vehicles. The following vehicles generate their paths through the central point of the trailer of the advancing vehicle. Accordingly, the trailer may be rapidly returned due to partial braking (s106-1). In this case, the minimum reference value Limit_Min and the maximum reference value Limit_Max may be previously set based on an experimental value.

In other words, when the lane departure amount of the advancing vehicle FV1 is equal to or greater than the preset maximum reference value Limit_Max, it is determined that an emergency situation occurs. Thus, a request for the partial braking is transmitted to the advancing vehicle FV1 without performing an operation of determining the partial braking over the trailer (s108).

When the lane departure amount of the advancing vehicle FV1 is less than the preset maximum reference value Limit_Max, the lane keeping assist apparatus 100 of the following vehicle FV2 requests the advancing vehicle FV1 to return the trailer of the advancing vehicle FV1. The lane keeping assist apparatus 100 also transmits information on whether there is a target in a blind spot warning area of the subject vehicle and information on the target through the V2V communication (s107).

In other words, the lane keeping assist apparatus 100 of the following vehicle FV2 may request the advancing vehicle FV1 to return the trailer when the lane departure amount of the advancing vehicle FV1 is greater than the minimum reference value and less than the maximum reference value.

The lane keeping assist apparatus 100 of the advancing vehicle FV1 determines whether there occurs an emergency situation requiring the partial braking control over the trailer. The determination is performed when receiving the request for the returning of the trailer, the information on whether there is a target in a blind spot warning area of the following vehicle FV2, and the information on the target (s108).

The lane keeping assist apparatus 100 of the advancing vehicle FV1 may perform partial braking over the trailer of the subject vehicle when at least one of the following three conditions is satisfied.
1. Condition 1: When a moving object is present in a BSW area of the advancing vehicle at a side of a lane opposite to a lane from which the trailer departs.
2. Condition 2: When a moving object is present within a specific distance from a front portion of the advancing vehicle at the side of the lane opposite to the lane from which the trailer departs.
3. Condition 3: When a moving object is present in a BSW area of the following vehicle and the speed of the moving object is higher than the current speed of the advancing vehicle.

The three conditions refer to situations in which the collision risk is present and a rapid returning is required when the vehicle moves to the opposite lane and travels while keeping the lane as the steering control is performed over the tractor.

The lane keeping assist apparatus 100 of the advancing vehicle FV1 requests hands-on user steering to perform the partial braking control over the trailer of the subject vehicle (s109). In this case, the lane keeping assist apparatus 100 of the advancing vehicle FV1 may output, on the display 130, a screen for requesting the user steering hands-on.

In other words, the lane keeping assist apparatus 100 of the advancing vehicle FV1 displays the hands-on request on a cluster or an HMI when the braking is applied to the trailer. Thus, a user prepares for reception of a control over the vehicle when an unexpected situation occurs during the partial braking.

Accordingly, the lane keeping assist apparatus 100 of the advancing vehicle FV1 performs the partial braking control over the subject vehicle. Thus, the trailer of the subject vehicle, which has departed from the lane, is returned into the lane.

As described above, according to the present disclosure, when the trailer is returned through conventional tractor steering, the trailer is slowly returned into the lane and thus the collision possibility with the surrounding vehicle occurs. Accordingly, to solve these disadvantages, the trailer is rapidly returned into the lane through the direct partial braking control over the trailer. Thus, the collision risk and possibility with the surrounding vehicle are rapidly reduced. Also, the central point of the advancing vehicle, which helps the following vehicle in the platooning line to generate the path thereof, is rapidly returned. Thus, the safety for the transverse control over the entire platooning line is increased.

Figure 5:
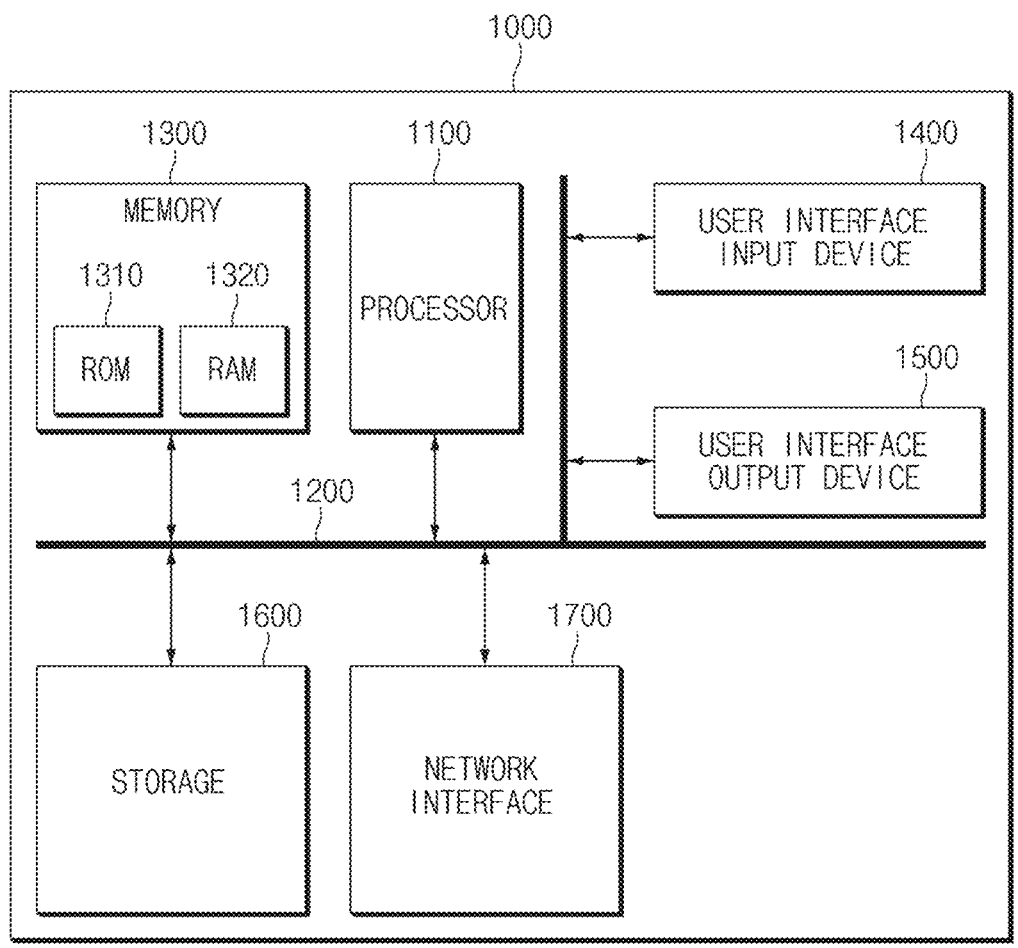
FIG. 5 illustrates a computing system according to an embodiment of the present disclosure.

FIG. 5 illustrates a computing system according to an embodiment of the present disclosure.

Referring to FIG. 5, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. The memory 1300 and the storage 1600 may include various types of volatile or non-volatile storage media. For example, the memory 1300 may include a read only memory (ROM) and/or a random-access memory (RAM).

Thus, the operations of the methods or algorithms described in connection with the embodiments disclosed in the present disclosure may be directly implemented with a hardware module, a software module, or combinations thereof, executed by the processor 1100. The software module may reside on a storage medium (i.e. the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside in a driver terminal. In another embodiment, the processor and the storage medium may reside as separate components of the driver terminal.

Hereinabove, although the present disclosure has been described with reference to the specific embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

Therefore, the specific embodiments of the present disclosure are provided to explain the spirit and scope of the present disclosure, but not to limit them. Thus, the spirit and scope of the present disclosure is not limited by the embodiments. The scope of the present disclosure should be construed on the basis of the accompanying claims. All of the technical ideas within the scope equivalent to the claims should be included in the scope of the present disclosure.

As described above, according to the present disclosure, the trailer is directly controlled through a partial braking instead of a steering control over a tractor in an emergency situation during a traveling. Thus, the trailer may rapidly return into a lane and thus the collision risk with a surrounding vehicle is reduced.

In addition, a variety of effects directly or indirectly understood through the present disclosure may be provided.

Hereinabove, although the present disclosure has been described with reference to the specific embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

What is claimed is:

1. A lane keeping assist apparatus of a vehicle with a trailer, the lane keeping assist apparatus comprising:
    a processor configured to:
    request an advancing vehicle to control a partial braking over the trailer of the advancing vehicle based on a lane departure amount of the advancing vehicle when the advancing vehicle departs from a lane,
    wherein the processor is further configured to request the advancing vehicle to control the partial braking over the trailer of the advancing vehicle when the lane departure amount satisfies a preset condition and transmit information on whether a target is present in a blind zone of a subject vehicle and information on the target when the lane departure amount satisfies the preset condition.

2. The lane keeping assist apparatus of claim 1, wherein the processor is further configured to:
    determine an intent of the advancing vehicle for a lane change when a rear wheel of the advancing vehicle departs from the lane.

3. The lane keeping assist apparatus of claim 2, wherein the processor is further configured to:
    determine the intent of the advancing vehicle for the lane change based on an On/Off state of a direction indication level of the advancing vehicle.

4. The lane keeping assist apparatus of claim 1, wherein the processor is further configured to:
    determine whether the lane departure amount satisfies the preset condition when the advancing vehicle has no intent for the lane change.

5. The lane keeping assist apparatus of claim 1, wherein the processor is further configured to:
    determine that an emergency situation occurs when the lane departure amount is equal to or greater than a specific reference level; and
    request the advancing vehicle to control the partial braking over the trailer of the advancing vehicle.

6. The lane keeping assist apparatus of claim 1, wherein the processor is further configured to:
    determine whether an emergency situation occurs to determine whether to control the partial braking over the trailer when receiving the request for controlling the partial braking over the trailer from a following vehicle.

7. The lane keeping assist apparatus of claim 6, wherein the processor is further configured to:
    determine that the emergency situation occurs, under at least one of:
    a situation in which a moving object is present in a blind zone of the advancing vehicle positioned at one side of a lane opposite to a lane from which the trailer departs;
    a situation in which a moving object is present within a specific distance to a front portion of the advancing vehicle positioned at one side of the lane opposite to the lane from which the trailer departs and the moving object is moving at a speed lower than a speed of a subject vehicle; and
    a situation in which a moving object is present within a blind zone of a following vehicle in a lane in which the subject vehicle is traveling and a speed of the moving object is higher than a speed of the advancing vehicle in a lane in which the subject vehicle is currently traveling.

8. The lane keeping assist apparatus of claim 6, wherein the processor is further configured to:
    output a request for hands-on user steering and control a partial braking of a front wheel of the subject vehicle to control the partial braking over the trailer.

9. A vehicle system of a vehicle including a trailer, the vehicle system comprising:
    a communication device configured to communicate with another vehicle during a travelling; and
    a lane keeping assist apparatus configured to request an advancing vehicle to control a partial braking over a trailer of the advancing vehicle through the communication device, depending on a lane departure amount of the advancing vehicle when the advancing vehicle departs from a lane,
    wherein the lane keeping assist apparatus is further configured to request the advancing vehicle to control the partial braking over the trailer of the advancing vehicle when the lane departure amount satisfies a preset condition and to transmit information on whether a target is present in a blind zone of a subject vehicle and information on the target when the lane departure amount satisfies the preset condition.

10. The vehicle system of claim 9, further comprising:
    a partial braking device controlled by the lane keeping assist apparatus to perform the partial braking over a front wheel of the trailer.

11. The vehicle system of claim 9, further comprising:
    a sensing device configured to sense that the advancing vehicle departs from the lane.

12. A lane keeping assist method comprising:
    determining a lane departure amount of an advancing vehicle when the advancing vehicle departs from a lane; and
    requesting the advancing vehicle to control a partial braking over a trailer of the advancing vehicle depending on the lane departure amount,
    wherein the requesting the advancing vehicle to control the partial braking over the trailer includes
    requesting the advancing vehicle to control the partial braking over the trailer of the advancing vehicle when the lane departure amount satisfies a preset condition, and
    transmitting information on whether a target is present in a blind zone of a subject vehicle and information on the target when the lane departure amount satisfies the preset condition.

13. The lane keeping assist method of claim 12, wherein the determining the lane departure amount of the advancing vehicle includes:
- determining an intent of the advancing vehicle for a lane change when a rear wheel of the advancing vehicle departs from the lane; and
- determining whether the lane departure amount satisfies the preset condition when the advancing vehicle has no intent for the lane change.

14. The lane keeping assist method of claim 12, further comprising:
- determining whether an emergency situation occurs to determine whether to control the partial braking over the trailer when receiving the request for controlling the partial braking over the trailer from a following vehicle.

15. The lane keeping assist method of claim 14, wherein the determining of whether to control the partial braking over the trailer includes:
- controlling the partial braking under at least one of:
  - a situation in which a moving object is present in a blind zone of the advancing vehicle at a side of a lane opposite to a lane from which the trailer departs;
  - a situation in which a moving object is present within a specific distance from a front portion of the advancing vehicle at the side of the lane opposite to the lane from which the trailer departs, and the moving object is moving at a speed lower than a speed of a subject vehicle; and
  - a situation in which a moving object is present in a blind area of a following vehicle in a lane in which the subject vehicle is traveling, and a speed of the moving object is higher than a present speed of the advancing vehicle in the lane in which the subject vehicle is currently traveling.

16. The lane keeping assist method of claim 14, further comprising:
- outputting a request for hands-on user steering when the control of the partial braking over the trailer is determined; and
- controlling the partial braking over a front wheel of a subject vehicle.

* * * * *